Patented Aug. 14, 1951

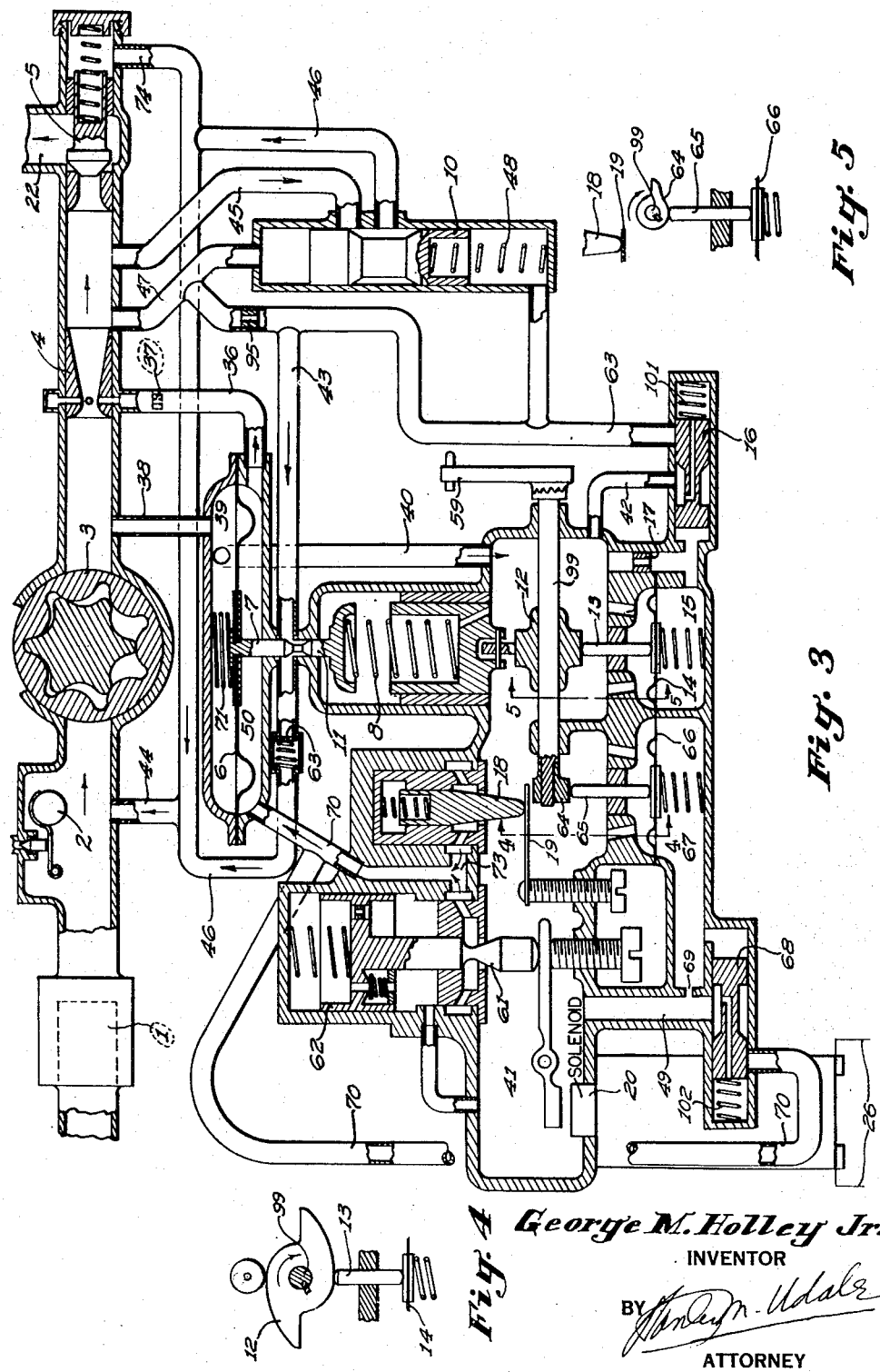

2,564,107

UNITED STATES PATENT OFFICE 2,564,107

FUEL FEEDING CONTROL FOR GAS TURBINES RESPONSIVE TO FUEL FLOW, TEMPERATURE, AND ACCELERATION

George M. Holley, Jr., Detroit, Mich., assignor to George M. Holley and Earl Holley Continuation of application Serial No. 544,602, July 12, 1944. This application September 26, 1946, Serial No. 699,581

8 Claims. (Cl. 60—41)

1

The object of this invention is the control of a gas turbine. The object is to provide means responsive to speed of the gas turbine power plant to regulate the fuel supply in order to maintain constant a selected turbine speed. A further object is to provide means responsive to the temperature of the combustion chamber associated with the gas turbine so arranged as to prevent the turbine from being subjected to gases at excessive temperature by limiting the fuel flow to the turbine when the temperature exceeded a safe limit. Other objects and advantages of the invention and method of operating the gas turbine will become apparent during the course of the following specification.

Fig. 3 shows diagrammatically the essential features of my invention.

Fig. 4 shows a partial cross-sectional elevation on plane 4—4 of Fig. 3.

Fig. 5 shows a partial cross-sectional elevation on plane 5—5 of Fig. 3.

Figure 1:
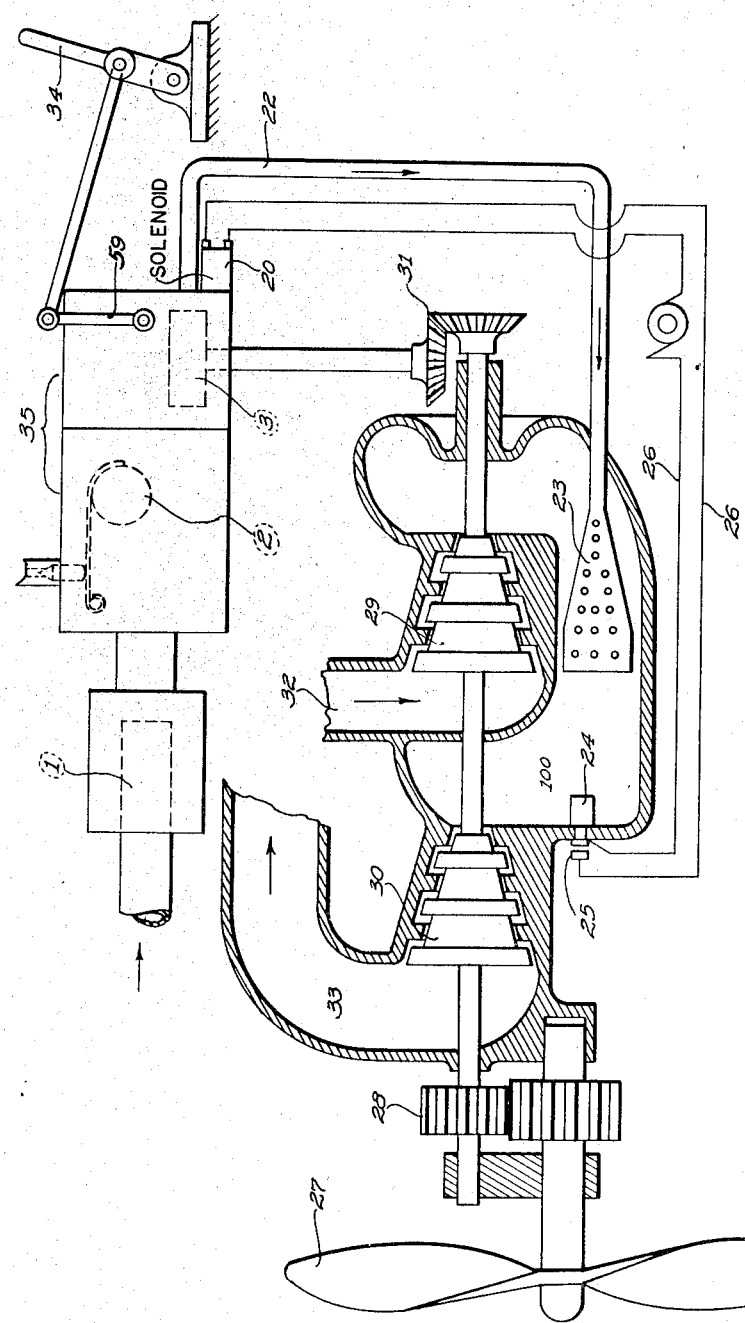
Fig. 1 shows diagrammatically the general arrangement of a gas turbine power plant to which my invention may be applied.

In Figure 1, the fuel enters through a fuel screen 1 close to a control housing 35, which contains a vapor separator float mechanism 2 and a pump 3 driven by the gas turbine. Fuel issues through the pipe 22 from the control chamber 35 through the burner 23 into the combustion chamber 100. The temperature responsive element 24, when heated above the danger point, engages with the stationary element 25, which causes electricity to flow through the electric connections 26. When the current flows, a solenoid 20 is energized and the control contained in housing 35 is modified. The flow of fuel from the entrance 1 to the outlet 22 is also controlled by means of a lever 59, which in its turn is controlled by the manually operated lever 34. The combustion products flow through the gas turbine 30 to the outlet 33. Gas turbine 30 is coupled with the air compressor 29, which draws air from the entrance 32. The gas turbine 30 and the air compressor 29 are coupled together and through the gears 28 drive the propeller 27 and through the gears 31 drive the fuel pump 3.

Figure 2:
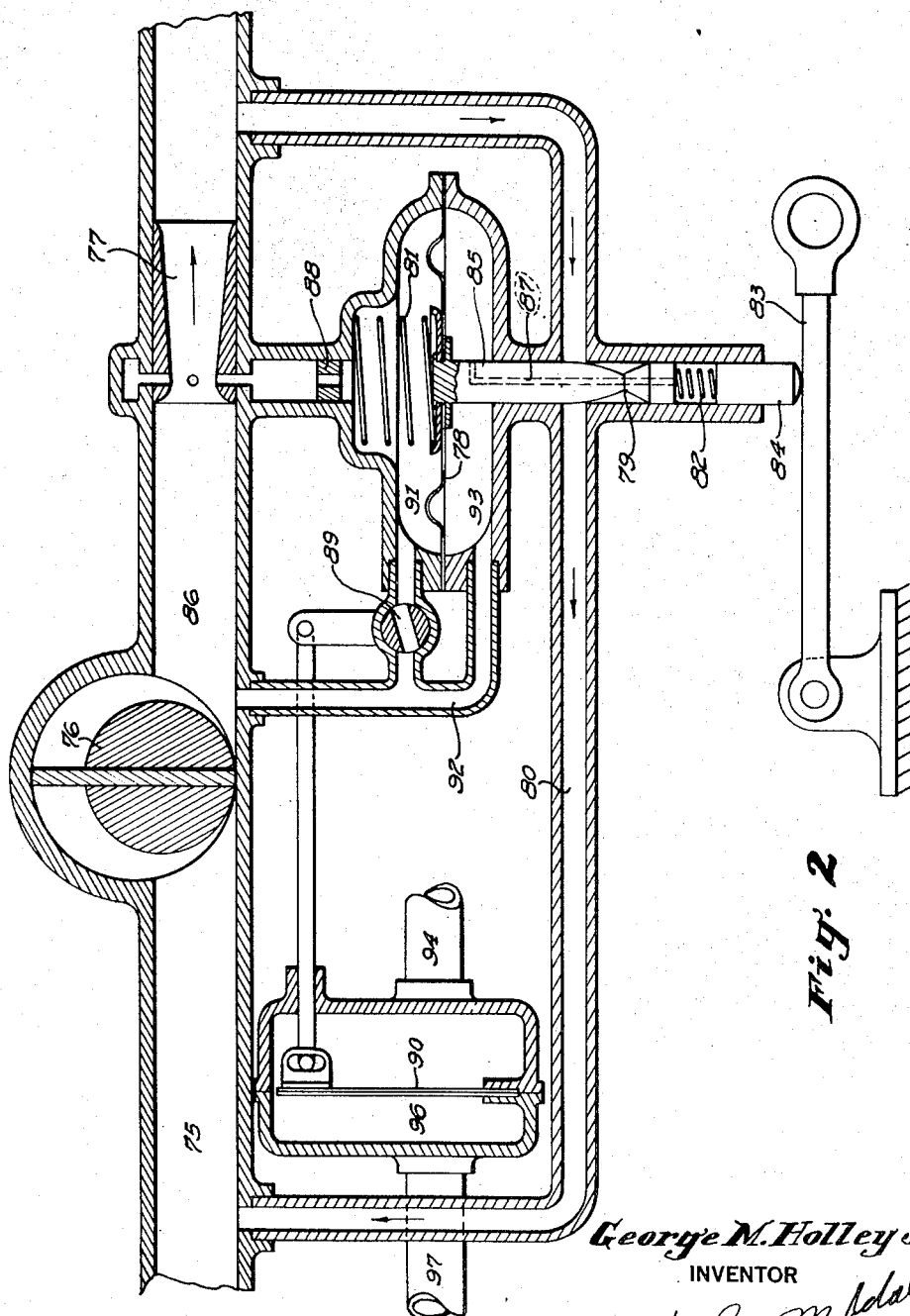
Fig. 2 shows diagrammatically the simplest form of my invention.

In Fig. 2, 75 represents the fuel entrance corresponding to 1 in Fig. 1, 76 represents a fuel pump corresponding to the pump 3 shown in Fig. 1. 86 is the fuel outlet, 77 is a fuel venturi, 80 is a bypass leading from the downstream side of the venturi 77 back to the fuel entrance 75. A

2 valve 79 located in a rod 85 when moved up into the open position permits fuel to flow through the pipe 80. In the position shown, flow through the bypass 80 is prevented by the rod 85.

A diaphragm 78 is connected to the valve 79 through the rod 85 and is moved by the depression in the throat of the venturi 77. A chamber 91 above the diaphragm 78 communicates through the restriction 88 to the throat of the venturi 77. Chamber 93 communicates with the pressure side of the pump 76; that is to say, with the passage 86. Valve 89 provides communication between the chambers 91 and 93. Hence, when the valve 89 is closed, the valve 79 has a tendency to move up into the open position. The compression spring 81 which holds the valve in the position shown is made sufficiently flexible to respond to the depression created by the venturi 77. The valve 89 is rotated counter-clockwise so as to close when the temperature responsive element 90 moves to the left. This thermostatic responsive element 90 is located in the chamber 96, which is connected with the combustion chamber 100 of Fig. 1 through the pipes 94 and 97. This thermostat 90 corresponds to the heat responsive element 24 shown in Fig. 1. When it is necessary to vary the flow, the manually operated lever 83 is moved; this moves the plunger 84, which compresses the spring 82, which spring engages with the bottom of the rod 85. A passage 87 balances the pressure of the fuel in the outlet 86 with the bottom of the rod 85.

In Figs. 3, 4 and 5, a fuel entrance is shown at 1, a fuel vapor separating mechanism is shown at 2, a fuel pump at 3, a fuel venturi at 4 and a spring loaded valve 5 controls the flow to an outlet 22. The spring loaded valve 5 is also supported by the pressure of the fuel entrance through the passage 74. A spring 71 imposes a light load on the rod 7, which rod is carried by a diaphragm 6 and incorporates a valve 11. This valve controls the flow of fuel from the downstream side of the venturi 4 through a pipe 47 through a restriction 95 along the pipe 43 past the spring loaded valve 63, pipe 46 to the pipe 44 and so to the fuel entrance 1.

The bypass valve 10, which is raised by the compression spring 48 and is depressed by the pressure of the fuel transmitted through a pipe 47 connects the downstream side of the venturi 4 through a pipe 45 with a pipe 46 and thus returns a portion of the fuel pumped through the venturi 4 back to the fuel entrance 1. The pressure below the valve 10 is determined by the pressure in the pipe 43, which is connected through the restriction 95 with the pipe 47. The movement of the valve 11 is thus immediately followed by the movement of the valve 10 so that when valve 11 opens, valve 10 closes and vice versa.

This valve 11 is moved by the manually controlled lever 59, through the cam 12 in Figure 4, which engages with the compression spring 8, which in its turn engages with the valve 11. The pressure in the chamber 50 below the diaphragm 6 is determined by the pressure in the throat of the venturi 4, the pipe 36 and restriction 37 connecting chamber 50 with the throat of the venturi 4.

Pipe 70 communicates through the passage 73 with the two valves 61 and 18, which permit a restricted communication between the chamber 50 and the chamber 41. The chamber 41 also communicates through the pipe 40 with the chamber 39, which is the high pressure side of the diaphragm 6; thus, when the valves 61 and 18 open, they tend to equalize the pressure on the two sides of the diaphragm 6. When this happens, the valve 11 rises under the influence of the compression spring 8 and permits flow along the passage 43.

Movement of the valve 61 is determined by the solenoid 20, which is controlled by the temperature responsive means 24 and 25 in Figure 1. As the temperature in the combustion chamber 100 rises, the valve 61 closes. A dash pot 62 permits the valve to close more rapidly than it opens so that when an excessive temperature is reached, the valve 61 closes quickly and opens slowly. Valve 18 responds to the temperature of the fuel in the chamber 41. Thermostatic element 19 engages with the valve 18 and is so designed that when the temperature is low, the element 19 moves clockwise, permitting the valve 18 to close, thus restricting the flow from the chamber 41 into the pipe 73. When the pilot's control lever 59 is rotated, the flow is varied because when the valve 11 opens, the valve 10 has a tendency to close. Now it requires a greater pressure differential across the diaphragm 6 in order to compress the spring 8 and to close the valve 11, and in order to obtain this greater pressure differential, pump 3 must rotate faster. That calls for an increase in the revolutions per minute of the turbine.

When the control lever 59 is moved hastily, the finger 13, which also engages with the cam 12, moves rapidly downward and moves the diaphragm 14 with which it engages and compresses the spring in the chamber 15, where the pressure is temporarily increased. The valve 16 is thus forced over to the right compressing the spring 101. The high pressure existing in the chamber 41 is transmitted through the pipe 42 to the pipe 63, which pressure combined with the effect of the compression spring 48 slows down the movement of the valve 10 down. There is thus a gradual decrease in flow from 45 to 46 back through 44 and a corresponding increase in fuel discharge out of 22.

A restricted passage 17 permits the pressure in the chamber 15 to increase with the pressure in 41. When this happens, the valve 16 is pushed back to the left by the compression spring, which controls its movement and the pipe 42 no longer communicates with the passage 63.

When the control lever 59 is thrown wide open in an emergency, the diaphragm 66 is compressed and the fuel in chamber 67 increases in pressure. The valve 68 is thus pushed to the left compressing the spring 102 and a path is opened from the passage 49 to the passage 70. The pressure in the chamber 50 then increases temporarily causing the valve 11 to rise, which causes the valve 10 to fall, decreasing the flow from 45 to 46 and increasing the flow past the valve 5. The pressure in the chamber 67 equalizes with the chamber 41 through the restriction 69, thus permitting the valve 68 to return to the right, cutting off the connection from the pipe 49 to the pipe 70. The amount of fuel bypassed by the valve 11 is limited by the restriction 95 and valve 63. The cam 64 engages with the pin 65 as shown in Figure 5.

Operation of Figure 2

When the device is in operation, the pump 76 delivers fuels in proportion to the revolutions of the turbine. The position of the lever 83 determines the speed of the turbine; for example, if the turbine is going faster than the speed corresponding to the position of the lever 83, the velocity through the venturi 77 is greater than the desired velocity. The result is that the pressure difference acting on the diaphragm 78 is sufficiently great so that the valve 79 rises and permits the return of the unneeded fuel from the venturi 77 back to the fuel entrance 75, and the speed reduction is thus obtained as lowered fuel reduces the energy available for operating the gas turbine. In a similar way, if the temperature generated is too high, thermostat 90 closes the valve 89 and increases the pressure difference on the two sides of the diaphragm 78 and again the valve 79 rises and reduces the speed of the turbine by increasing the flow through the bypass 80. The thermostat 90 is therefore a safety device so that however high the speed may be that is selected by the lever 83, that speed will not be maintained if it results in an excessive temperature but will be automatically reduced to whatever temperature is safe.

Operation of Figure 3

The fuel entering at 1 flows by the vapor separator 2 where vapor escapes. Pump 3 passes a quantity of fuel which varies directly with the revolutions per minute of the engine. This flows through the venturi 4, and the velocity in the throat produces a pressure difference which varies as the square of the speed of the turbine. The fuel then flows past the valve 5, which is spring loaded and subjected to the pressure difference created by the pump 3, then discharges to the burner 23 in Fig. 1 through the passage 22. The pressure differences created by the venturi 4 is applied to the upper and lower sides of the diaphragm so as to move the rod 7 and valve 11. The passage 36 communicates through the restriction 37 the low pressure in the throat of the venturi 4 to the chamber 50 above the diaphragm 6. Because of the restriction 37 in the passage 36, the low pressure beneath the diaphragm 6 can be controlled by admitting a restricted quantity of high pressure fuel to the chamber 50.

Passage 38 applies the high pressure in the outlet to the pump 3 to the chamber 39 above the diaphragm 6. This chamber communicates through the pipe 40 with the lower chamber 41. In this chamber 41 are located a manually controlled shaft 99 carrying the cams 12 and 64 and two heat responsive elements 19 and 61. 19 is a bi-metallic element that responds to the temperature of the fuel in the chamber 41. 61 is a valve which responds to the temperature in the combustion chamber 100 (Fig. 1).

The cam 12 through the spring 8 controls the valve 11. Cam 12 also engages with the finger 13, which controls the diaphragm 14 (Fig. 4), which when depressed raises the pressure in the chamber 15. This increase in pressure in the chamber 15 however only remains for a short period of time because the restriction 17 allows the pressure in chamber 15, below the diaphragm 14, to equalize quickly. Meanwhile, valve 16 is moved quickly over to the right, allowing the pipe 42 to communicate with the pipe 63. High pressure fuel then flows into the pipe 63 and across pipe 43 past the valve 11 and the spring loaded valve 63 back through the pipe 44 to the fuel entrance 1. Bypass valve 10 is then moved up into a position shown and the high pressure fuel descends through the pipe 45 past the bypass valve 10 and escapes through passages 46 and 44 to the fuel entrance 1. The temporary movement of valve 16 merely slows down the action of the valve 10.

When the valve 16 returns to the left, as it does after a short interval of time, the pressure in pipe 43 is applied below the valve 10; meanwhile, the pressure downstream from the venturi 4 is applied through the pipe 47 to the upper part of the valve 10, which is pushed down compressing the spring 48 and closing the bypass 46/45.

In an emergency, the pilot control 59 is thrown all the way over and the cam 64 (Fig. 5) engages with the finger 65 depressing the diaphragm 66, which raises the pressure in the chamber 67 and moves the valve 68 over to the left compressing the spring 102 on the left. This permits high pressure to flow from the pipe 49 through the pipe 70 and so to the chamber 50 below the diaphragm 6. This raises the diaphragm 6 and with it the valve 11, which reduces the pressure below the bypass valve 10 so that the spring 48 can no longer support the valve in the position shown against the pressure applied above the valve 10 by the pipe 47. Therefore, all the fuel flowing through the venturi 4 passes the valve 5 into the pipe 22.

In order to correct for a variation in the density of the liquid, thermostatic element 19 controls the valve 18 so that when the fuel is dense due to a low temperature, valve 18 closes and the pressure in the chamber 50 decreases. This decrease in the pressure at 50 causes the valve 11 to fall slightly, which increases the pressure somewhat in the pipe 43, which pressure acts below the valve 10. Hence, the valve 10 rises slightly and reduces the flow past the valve 5 by returning a larger proportion of the fuel to the fuel entrance 1.

When the temperature in the combustion chamber 100 (Fig. 1) is excessive, the temperature responsive element 24, engaging with the electrical contact 25, causes the solenoid 29 to function, thus raising the valve 61. This cuts off communication between chamber 41 and the lower side of the diaphragm 6 so that the pressure in 50 falls, and the valve 11 falls. When the valve 11 falls, the pressure in 43 rises, valve 10 rises and more fuel escapes to the bypass 45/46, which means less fuel burned in the chamber 53, and the temperature is restored to the desired maximum temperature in the combustion chamber 100.

This application is a continuation of application Serial No. 544,602, filed July 12, 1944, and now abandoned.

What I claim is:

1. In a control for a gas turbine power plant including a supercharger and an air entrance, a combustion chamber, a burner located therein, a positive displacement fuel pump driven by said gas turbine adapted to supply fuel to said burner, a venturi in the outlet from said pump, a bypass leading from the downstream side of said venturi to the entrance to said fuel pump, means responsive to the depression in the throat of said venturi comprising a chamber, a moving wall therein dividing said chamber into two halves, one half connected to the throat of said venturi, the other side being subjected to the fuel pressure generated by said fuel pump, a valve connected to said moving wall, yieldable means opposing the movement of said valve, manually operated means for increasing and decreasing said yieldable means, said valve being adapted to control the flow through said bypass, a restriction in said bypass between said valve and the downstream side of said venturi, a second bypass of relatively large size also leading from the downstream side of said venturi to the entrance to said fuel pump, a balanced valve in said bypass, spring means for moving said balanced valve into the open position, means responsive to the drop in pressure in the first bypass for moving said balanced valve to the closed position whereby when the first mentioned valve moves toward the open position the balanced valve is automatically moved to the closed position.

2. A device as set forth in claim 1 in which there are means responsive to the movement of the said manually operated means which increases said yieldable means for temporarily opening said balanced valve.

3. A device as set forth in claim 1 in which there are means responsive to the final movement of said manually operated means, which increases said yieldable means for temporarily closing said balanced valve.

4. A device as set forth in claim 1 in which there is another moving wall, a chamber associated therewith, means responsive to the opening movement of said manually operated means for moving said wall to reduce the volume of said chamber, a movable valve yieldably responsive to the increase in pressure in said chamber, said valve being adapted to admit fuel under pressure to said balanced valve so as to open said valve.

5. A device as set forth in claim 1 in which there is another moving wall, a chamber associated therewith, means responsive to the final opening movement of said manually operated means for moving said wall to reduce the volume of said chamber, a movable valve yieldably responsive to the increase in pressure in said chamber, said valve being adapted to admit fuel under pressure to the first mentioned movable wall so as to close the valve connected thereto and to cause the balanced valve to open.

6. A device as set forth in claim 1 in which there are temperature responsive means associated with said combustion chamber, a passage forming a bypass from one side of said moving wall to the other, a valve therein operatively connected to said temperature responsive means so as to restrict said bypass when the temperature in said combustion chamber exceeds a predetermined value.

7. A device as set forth in claim 1 in which there is a passage forming a bypass from one side of said moving wall to the other, a valve therein, temperature responsive means located in the fuel flowing through said bypass operatively connected to said valve so as to restrict said bypass when the temperature of the fuel rises.

8. A prime mover, a source of liquid fuel to operate said prime mover, the combination of a positive displacement fuel pump driven by the said prime mover, a venturi through which the fuel displaced by the pump passes, a bypass of substantial size adapted to return a substantial portion of the fuel to the entrance of said pump, a valve in said bypass, means including a moving wall responsive to the depression in the throat of said venturi for moving said valve to the open position, spring yielding means for opposing the movement of said wall responsive to said depression, manual means for controlling said yielding means, acceleration responsive means including pumping means energized by the movement of said manual control means, override control means for the bypass valve responsive to the pressure generated by said pumping means.

GEORGE M. HOLLEY, Jr.

REFERENCES CITED

The following references are of record in the file of this patent:

UNITED STATES PATENTS

| Number | Name | Date |
|---|---|---|
| 1,052,172 | Rateau | Feb. 4, 1913 |
| 1,132,940 | Jay | Mar. 23, 1915 |
| 1,899,396 | Ray | Feb. 28, 1933 |
| 2,004,638 | Smith | June 11, 1935 |
| 2,078,957 | Lysholm | May 4, 1937 |
| 2,095,991 | Lysholm | Oct. 19, 1937 |
| 2,179,846 | Finnigan | Nov. 14, 1939 |
| 2,219,488 | Parker | Oct. 29, 1940 |
| 2,229,805 | Graves | Jan. 28, 1941 |
| 2,281,411 | Campbell | Apr. 28, 1942 |
| 2,403,371 | Ifield et al. | July 2, 1946 |
| 2,404,428 | Bradbury | July 23, 1946 |
| 2,405,888 | Holley, Jr. | Aug. 13, 1946 |
| 2,407,115 | Udale | Sept. 3, 1946 |
| 2,422,808 | Stokes | June 24, 1947 |